United States Patent [19]

Miller et al.

[11] 3,959,066
[45] May 25, 1976

[54] APPARATUS FOR MANUFACTURING THE BODY PORTION OF A COLLAPSIBLE SQUEEZE TUBE

[75] Inventors: William P. Miller, Meriden, Conn.; Robert W. Twigg, Rockford, Ill.

[73] Assignee: Polytube, Inc., Hamden, Conn.

[22] Filed: Sept. 13, 1974

[21] Appl. No.: 505,925

[52] U.S. Cl. ............................ 156/459; 72/133; 72/166; 93/77 CL; 113/1 B; 113/1 G; 113/113 R; 156/443; 156/499
[51] Int. Cl.² ...................... B21D 5/10; B29D 23/10
[58] Field of Search ............... 72/38, 45, 166, 133; 113/1 B, 1 G, 113 C, 120 D, 113 R; 93/DIG. 1, 77 R, 77 CL; 156/184, 218, 443, 459, 499, 510

[56] References Cited
UNITED STATES PATENTS

| | | | |
|---|---|---|---|
| 2,089,169 | 8/1937 | Anderson | 72/166 |
| 2,130,727 | 9/1938 | Aument | 156/184 |
| 2,230,410 | 2/1941 | Parkhurst | 93/77 R |
| 2,315,535 | 4/1943 | McCann | 113/113 R |
| 2,399,338 | 4/1946 | Ford | 156/218 |
| 2,403,995 | 7/1946 | Peters | 156/218 |
| 2,647,553 | 8/1953 | Sharf | 72/38 |
| 2,927,624 | 3/1960 | Hughes | 156/443 |
| 3,510,378 | 5/1970 | Kramer | 156/218 |
| 3,723,219 | 3/1973 | Prince et al. | 156/218 |
| 3,730,393 | 5/1973 | Ledewitz et al. | 222/106 |
| 3,764,425 | 10/1973 | Neff et al. | 156/218 |

FOREIGN PATENTS OR APPLICATIONS

| | | | |
|---|---|---|---|
| 393,723 | 11/1965 | Switzerland | 156/184 |

Primary Examiner—C. W. Lanham
Assistant Examiner—E. M. Combs
Attorney, Agent, or Firm—Ryder, McAulay, Fields, Fisher & Goldstein

[57] ABSTRACT

Three-ply web material is rolled approximately 360° into the form of a cylinder within a preform cavity. A feed roller at the opening rotates continuously and a spring loaded pressure plate has an edge at the opening which forces the web material against the feed roller. After the trailing edge of the segment of web material has passed the edge of the pressure plate, contact between feed roller and web material is lost and the circumferential position of the seam of the preform is thus precisely located. There is a slight overlap between the ends of the material at the same. The preform is longitudinally transferred into a non-conducting cylindrical forming cavity where heat and pressure are applied to fuse the overlap and form the seam. Heat is applied by induction heating through the walls of the forming cavity to the aluminum ply at only the overlap area. Pressure is applied by an expandable balloon mandrel inside the preform.

14 Claims, 12 Drawing Figures

APPARATUS FOR MANUFACTURING THE BODY PORTION OF A COLLAPSIBLE SQUEEZE TUBE

REFERENCE TO RELATED PATENTS

This application is to certain improvements in the apparatus and methods described in U.S. Pat. No. 3,730,393 issued on May 1, 1973 to William Ledewitz and Robert W. Twigg.

BACKGROUND OF THE INVENTION

This invention relates to a machine and method for manufacturing a collapsible squeeze tube container of the type in which toothpaste, shaving cream and a wide variety of lotions are typically packaged. In particular, this invention related only to the method and apparatus for making the cylindrical body of such a squeeze tube.

The attainment of a satisfactory squeeze tube container is beset with conflicting utilitarian and aesthetic requirements. For example, it is important that the materials contained in the tube not leak through the tube and that the outside environment, particularly oxygen, not leak into the tube. Leakage in either direction is particularly serious where toothpaste is involved since such leakage deteriorates the flavor of the toothpaste. At the same time, it is important that the tube has a compliant, relatively non-resistant feel in order to attain adequate consumer acceptance. These two requirements tend to pose conflicting problems and the attainment of one requirement tends to be at the expense of the other requirement.

To minimize leakage through the wall of the tube, a metal foil such as aluminum is required. But it is important that the metal foil not be attacked by the contents of the container or by the outside environment. Accordingly, the metal foil is generally coated with inner and outer plies of plastic, such as polyethylene. In addition, there are usually adhesive plies between the polyethylene plies and the aluminum ply.

The relatively low cost of the consumer products which are contained in such a tube require that the tube itself be reasonably inexpensive. Accordingly, it is a major purpose of this invention to provide improved techniques for manufacturing a collapsible squeeze tube that is inexpensive in cost yet meets the aesthetic and functional requirements for such a tube.

Because these squeeze tubes are used in very large volume, it is a related purpose of this invention to provide improved techniques for producing a large quantitiy of squeeze tubes in as automatic a fashion as possible and to do so with techniques that provide a minimum of rejected product.

A related purpose of this invention is to provide a manufacturing method and apparatus which will result in an improved percentage of acceptable products from the point of view of both leakage as well as looks. More particularly, it is a purpose of this invention to provide an apparatus design in which the preform of the cylindrical product is accurately squared (that is, avoids any slight spiralling effect) and in which there is a minimum risk of jam-up of the product, particularly where the thickness of the material may vary from time to time.

A further related purpose of this invention is to provide a sealing technique that is effective and that will increase the acceptance rate by reducing the rejection rate for leakage.

BRIEF DESCRIPTION

Three-ply web material is rolled approximately 360° onto the form of a cylinder within a preform cavity. The web material is cut into appropriate segments and then fed through a longitudinal opening into the preform cavity. A feed roller at the opening rotates continuously and a spring loaded pressure plate has an edge at the opening which forces the web material against the feed roller to assure continuous feed. After the trailing edge of the segment of web material has passsed the edge of the pressure plate, contact between feed roller and web material is lost and the seam of the preform is thus precisely located. Location of this overlap area is important so the seam, and only the seam, can be heated at a later step. In the preform cavity there is about 100 mils (0.001 inches) of overlap between the ends of the material to form the seam. Then the preform which is in the form of a cylinder is longitudinally transferred into a non-conducting cylindrical forming cavity. Heat and pressure are applied to fuse the 100 mil overlap area together. Heat is applied by induction heating through the walls of the forming cavity to the aluminum ply at just the overlap area. Pressure is applied by means of an expandable balloon mandrel inside the rolled web material to press the rolled web material against the inner wall of the forming cavity. After the overlapping edges of the web material have been fused together, the resulting product is shrunk slightly by cooling jackets clamped around the forming cavity. After cooling the flexible cylindrical tube body is removed from the forming cavity on a removal mandrel that has been inserted into the flexible cylinder. The removal mandrel, like the forming mandrel, is an expandable balloon mandrel.

THE DRAWINGS

FIG. 6 is an end view, along a plane perpendicular to that of FIGS. 3 through 5, showing the pusher mechanism for transferring the preformed cylinder from the preform cavity to the forming cavity.

FIG. 9 appears on the same sheet as does FIG. 6.

FIG. 10 appears on the same sheet as does FIG. 6.

FIG. 11 is taken along the line 11—11 in FIG. 2.

DESCRIPTION OF THE PREFERRED EMBODIMENTS

The invention disclosed herein are improvements to the apparatus shown in U.S. Pat. No. 3,730,393 and thus aspects of the tube making apparatus which are the same as or essentially similar to that disclosed in said patent are not repeated herein. In particular, the indexing mechanism for indexing the disc from station to station, the cooling jacket mechanism and the ejection mechanism for ejecting the formed tube from the forming cylinder are essentially the same in the apparatus of this invention and in the apparatus described in said patent. A description of these aspects of the apparatus can be found in connection with the discussion of FIGS. 18 through 35 of said patent.

Said patent also described a flexible cylinder which is fabricated from a three ply web that is convolutely wound approximately 720° thereby providing a dual aluminum foil wall. The instant invention is directed to apparatus which is used for manufacturing a flexible cylinder from a three ply web that is wound only aproximately 360°. More specifically, the web is wound 360° plus one-tenth of an inch overlap in a preform cavity to provide a preform cylinder. This preform cylinder is then transferred to a forming cylinder where the overlap longitudinal edges are sealed under heat and pressure to provide the end product.

Figure 1:
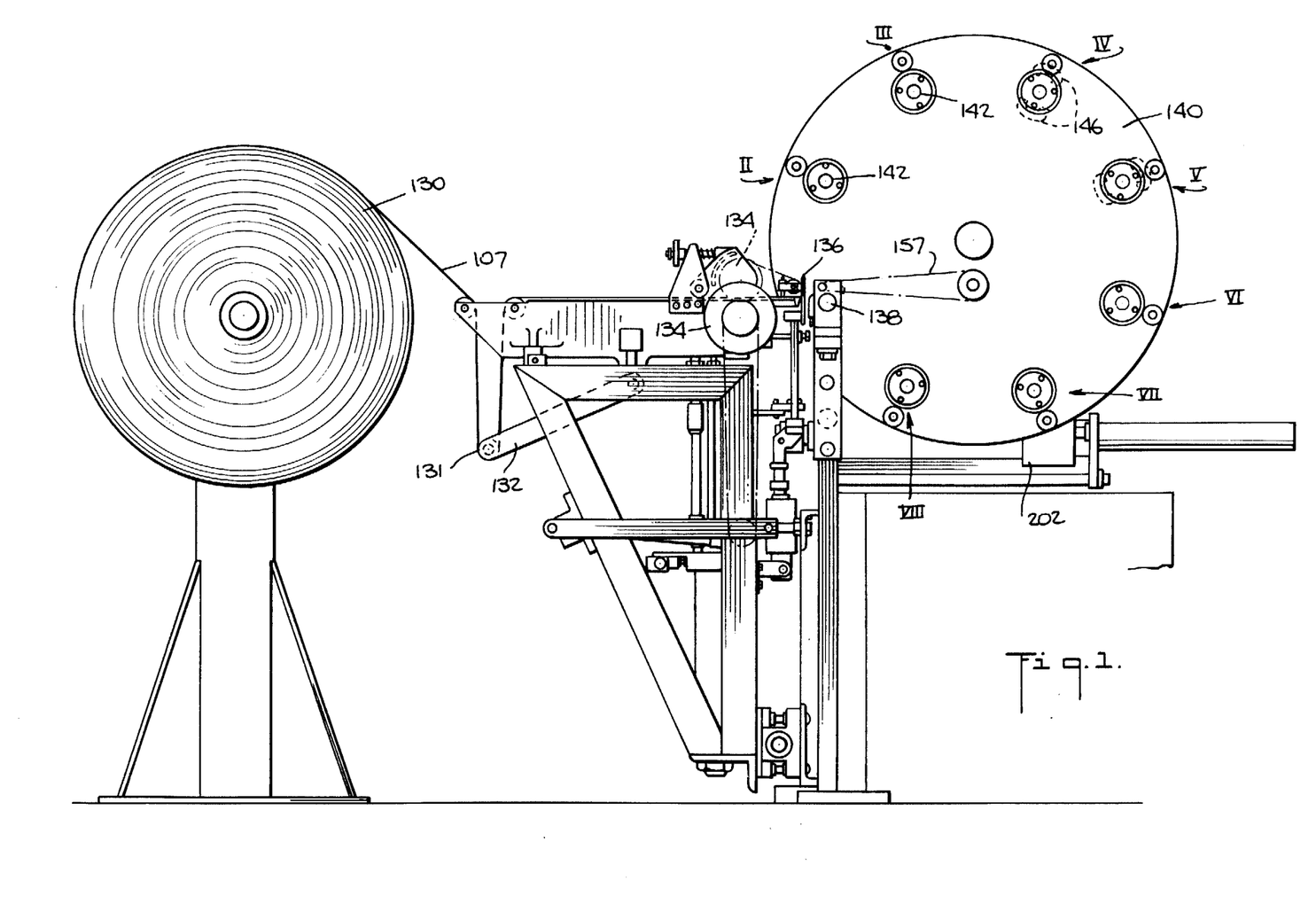
FIG. 1 is a simplified front elevation view of the production machine of this invention.

FIG. 1, is a simplified front elevational view of the apparatus of this invention. With an understanding of the overall apparatus shown in FIG. 1, one can better understand the individual stages and units that perform the individual operations such as preforming and fusing to form the collapsible cylinder end product.

Figure 3:
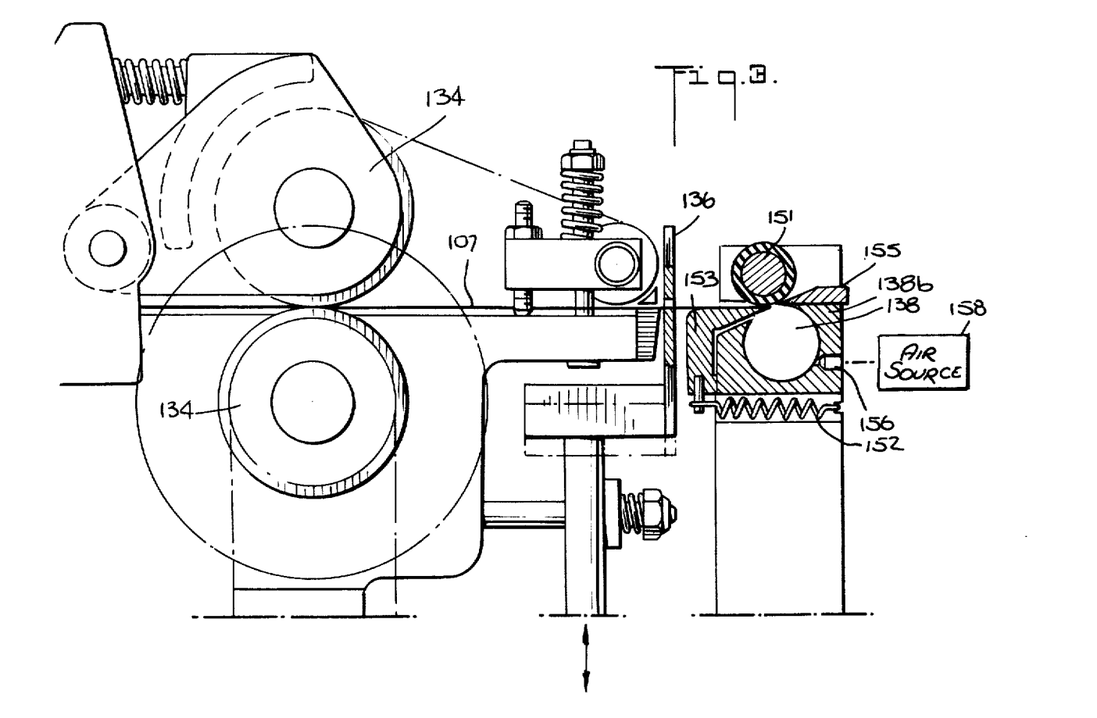
FIG. 3 is an enlarged view of a central portion of FIG. 1 showing in greater detail the mechanism for preforming the collapsible cylinder

As shown in FIG. 1, the three ply web of material 107 is fed from a roll 130, around rollers 131, by way of a tension maintaining dancer arm 132, between a pair of drive rollers 134 and then through a guillotine blade 136 into a preform cavity 138 (see FIG. 3). The width of the web 107 is equal to the length of the cylinder that is to be fabricated. The blade 136 is controlled by a conventional crankshaft mechanism (not shown) to cut the web 107 into units long enough to be rolled approximately 360° plus a slight overlap.

Figure 11:
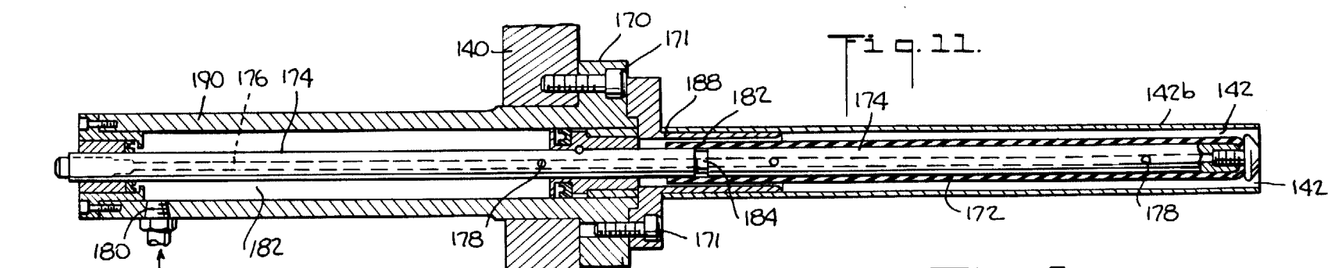
FIG. 11 is a longitudinal sectional view of one of the forming cavities carried on the rotatable disc.

A rotatable disc 140 is mounted behind the preform cavity 138. In one embodiment, this disc has a diameter of twenty eight inches. The disc 140 carries eight forming cavities 142 one of which is shown in FIG. 11. These forming cavities are equally spaced circumferentially around the disc and project forward from the disc 140. By means of an intermittent drive, the disc 140 rotates in steps of 45° at a time. The preformed flexible cylinder that is in the preform cavity 138 is transferred to a forming cavity 142 located directly behind the preform cavity 138. The forming cavity containing the preformed flexible cylinder then rotates 45° from this first position I to a second position II where a balloon mandrel 172 within the cavity 142 inflates to exert pressure on the inner wall of the preformed cylinder 112 (see FIG. 10). At position III, heat is applied to fuse the longitudinal seam and form the end product cylinder 100. The forming cavity 142 then goes through two positions, IV and V of cooling. During each of these two stages, cooling jackets 146 are clamped around the forming cavity 142 in order to cool the formed collapsible cylinder and cause the formed cylinder to shrink enough to break away from the inside wall of the forming cavity 142. At position VI a removal mechanism (not shown) positioned in front of the disc 140 removes the formed cooled end product cylinder from the forming cavity 142. In the embodiment shown, positions VII and VII do not perform an operational function.

The various units and assemblies that are not mounted on the disc 140 are positioned in front of the disc 140 as the disc 140 in shown in FIG. 1. Specifically, these units and assemblies are: the preform unit and transfer mechanism located at station I of the disc, the heating unit at station III, the cooling units at stations IV and V, and finally the removal apparatus.

There are a large number of limit switches which are actuated by various movements of the disc 140, piston 166, mandrel support tube 174, and other items described and shown to provide timing and sequencing. Such mechanism is obvious to one skilled in the art once this disclosure is known and understood and thus details of the sequencing and timing mechanism are not disclosed herein.

Figure 2:
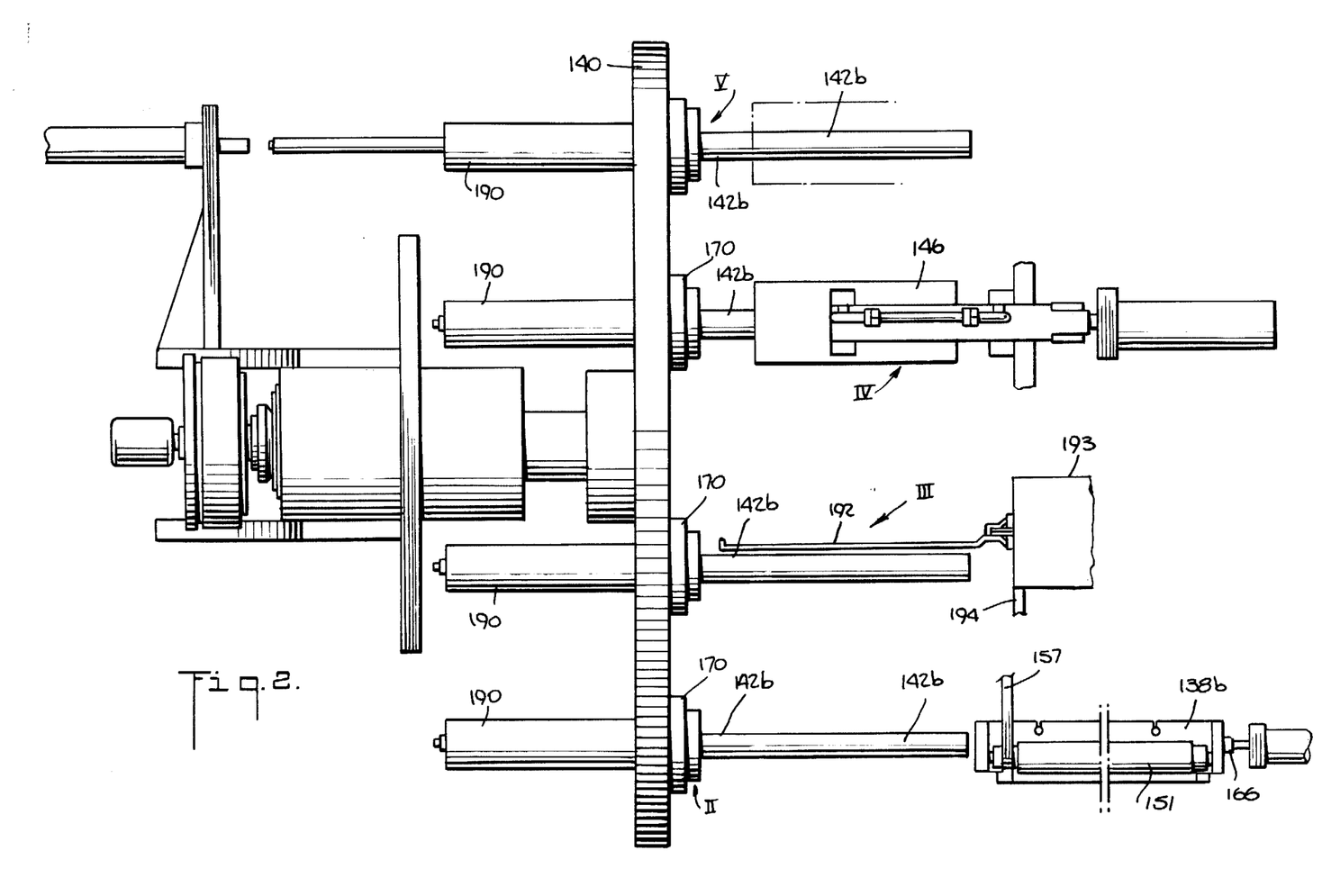
FIG. 2 is a simplified plan view showing the edge of the vertical main disc in FIG. 1 apparatus together with associated elements carried by the disc.
Figure 4:
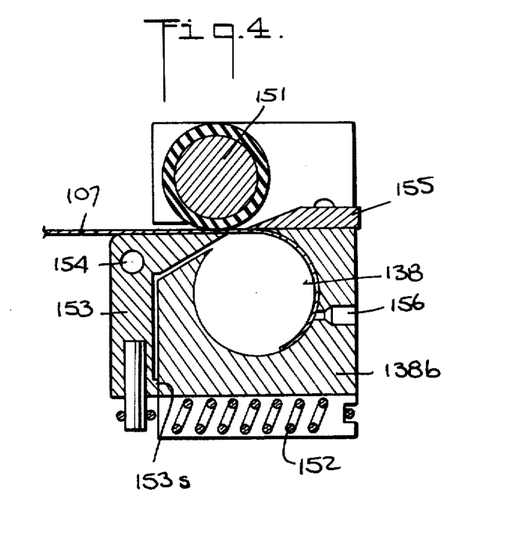
FIG. 4 is a fragmentary schematic cross-section through the perform cavity showing the web material partially fed into the preform cavity.
Figure 5:
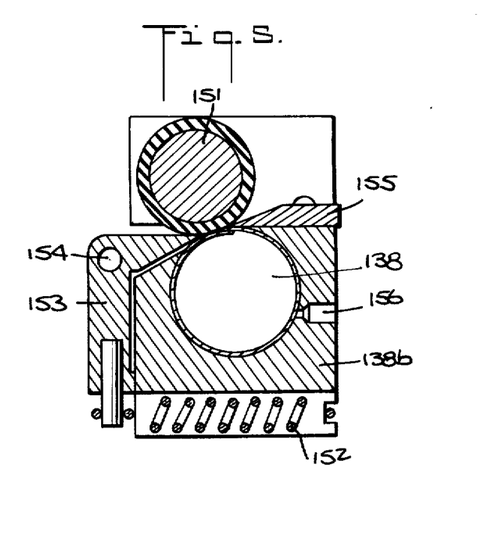
FIG. 5 is a view similar to FIG. 4 showing the completion of the preformed cylinder.

As may be seen in FIGS. 2 and 3, a cylindrical preform cavity 138 has a tangential opening 150 through which the web 107 is fed by the feed roller 151. This opening 150 extends the length of the cavity 138. As the web 107 enters the preform cavity 138, the web 107 curves around the wall of the cavity 138 as shown in FIGS. 4 and 5. A rotatable rubber friction feed roller 151 is positioned at the opening 150 of the cavity 138 to contact the web 107 as the web 107 enters the cavity. The feed roller 151 is a driven roller driven by drive belt 157. Thus the roller 151 drives the web 107 around the cavity wall. This feed roller 151 is essentially tangent to the chamber 138. A spring 152 loaded pressure plate 153 is biased by the spring 152 in a counterclockwise direction (as seen in the FIGS.) around a pivot point 154. When there is no web 107 being fed into the chamber 138, a stop 153s holds the pressure plate 153 spaced from the feed roller 151 by an amount slightly less than the thickness of the web material 107. As a consequence, when the web 107 is fed into the cavity 138, the plate 153 is forced to rotate in clockwise direction (against the counterclockwise bias of the spring 152) to provide positive control over the positioning of the web material as it enters the cavity 138. The plate 153 pushes the material 107 up against the feed roler 151 to assume proper continuous feeding of the material 107. Another reason for having the pressure plate 153 rotatable a slight amount is to provide accommodation for slight variations in the thickness of the web material 107.

The guide plate 155 is spared from the feed roller 151 by an amount substantially less than the thickness of the material 107 and assumes that the material 107 is deflected into the cavity 138 rather than up and around the feed roller 151.

The feed roller 151, runs continuously. It is positioned nearly tangent to the chamber 138 but sufficiently off-tangent so that when the trailing edge of the segment of web material 107 has passed the end of the pressure plate 153 and is into the chamber 138, the feed roller 151 no longer serves to furher propell the web material into the chamber 138. The material 107 contacts the roller 151 only because the plate 153 pushes the material 107 against the roller 151. Accordingly, the location within the cavity 138 of the overlap between the leading and trailing edges of the segment of web material 107 is precisely determined at a position immediately below the edge of the guide 155. Thus the pressure plate 153 and feed roller 151 cooperate to assure that the web is positively fed into the chamber 138 until the trailing edge of the material 107 segment passes the end of the plate 153 and then that the movement of material 107 stops. This cooperation of plate 153 and roller 151 occurs because of the spring 152 bias of the plate 153. Alternatively, the roller 151 could be spring-biased toward the plate 153.

While the web 107 is being fed into chamber 138, a very light air streams is introduced into the chamber 138 from a source 158 through an inlet 156. The opening into the cavity 138 is a forty mil (0.040 inch) hole in one embodiment. This air stream aids in reducing friction between the wall of the chamber and the web material and thus aids in assuring that the web material rolls up evenly and smoothly without ridges and bends.

The two drive rollers 134 operate intermittently to feed out, during each operation, an amount of web material 107 exactly equal to that required to form a single tube. After the proper amount has been fed, the feed rollers 134 stop and the cutting blade 136 cuts the web 107 leaving an amount of material to the right (as seen in FIG. 3) of the cutting blade 136 exactly equal to the amount of material required for one end product tube.

The form block feed roller 151 operates continuously and picks up the leading edge of the segment of web material 107 and, as shown in FIGS. 4 and 5, feeds the segments of web material around the wall of the cavity 138 to form an intermediate product.

This preform arrangement involving the feed roller 151 and pressure plate 153 appears to maintain a well squared feeding process, once the initial adjustments and alignments are made. That is, with the arrangement shown, the amount and frequency of spiraling of the segment of web material 107 that is being preformed is minimal. One reason for this may be that any initial spiraling is compensated for at the end of the feeding process because the feed roller 151 remains in contact with the lagging side to provide an additional thrust that tends to square up the preform. Perhaps, the maintenance of a fairly constant pressure between roller 151 and plat 153, regardless of thickness variation in the web material 107, aids in assuring the kind of steady unvarying continuous feed that results in proper squaring up of the material. In any case, the preform apparatus described does provide for an improved machine characteristic in minimizing the amount of spiraling involved.

Once the preform operation has been completed, a transfer device (located in front of the preform cavity 138) is operated to push the intermediate product 112 out of the preform cavity 138 back into a forming cavity 142.

Figure 7:
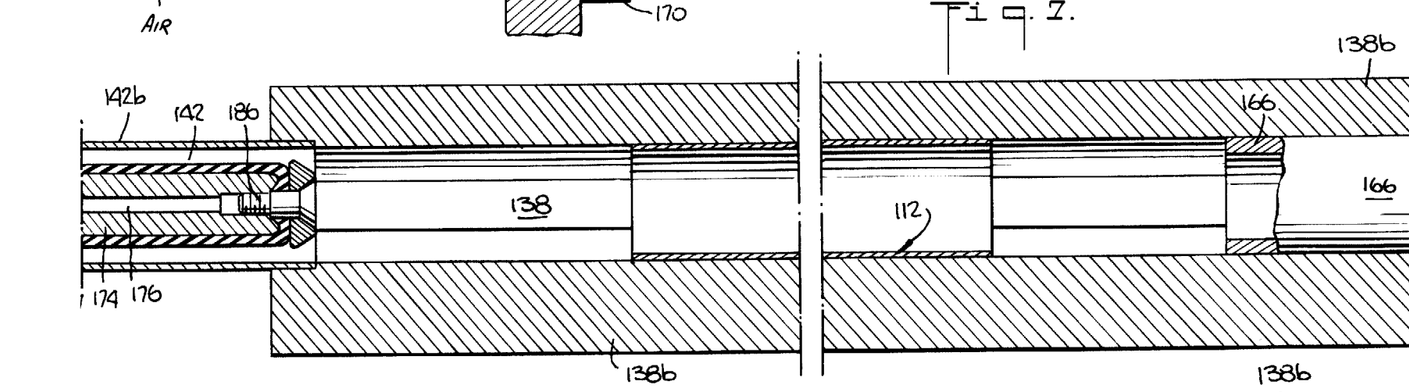
FIG. 7 is a transverse sectional view through the preform cavity and a front portion of the forming cavity showing the engagement between the preform cavity and forming cavity just prior to inserting the preformed cylinder into the forming cavity.
Figures 8, 9, 10, 12:
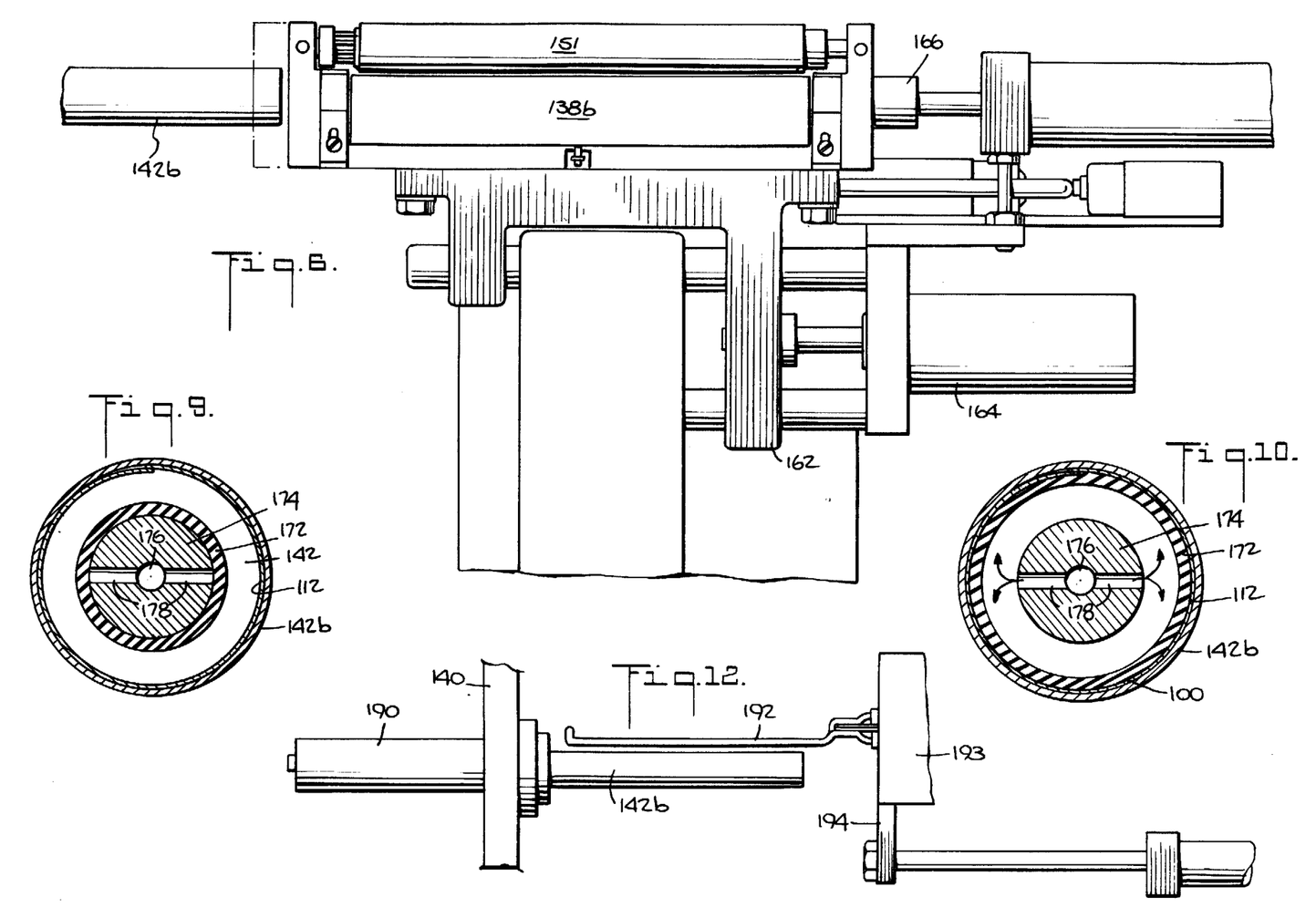
FIG. 8 is a transverse sectional view through the forming cavity and a rear portion of the preform cavity showing the preformed cylinder inserted into the forming cavity.
FIG. 9 is a cross-sectional view taken along the plane 9—9, of FIG. 8 showing the preformed cylinder in the forming cavity immediately after insertion therein.
FIG. 10 is a view identical to that of FIG. 9 after the inflatable forming mandrel has been inflated.
FIG. 12 is an edge view of the rotatable disc along a plane showing the relationship of the rf heating element to the forming cylinder.
Figure 8:
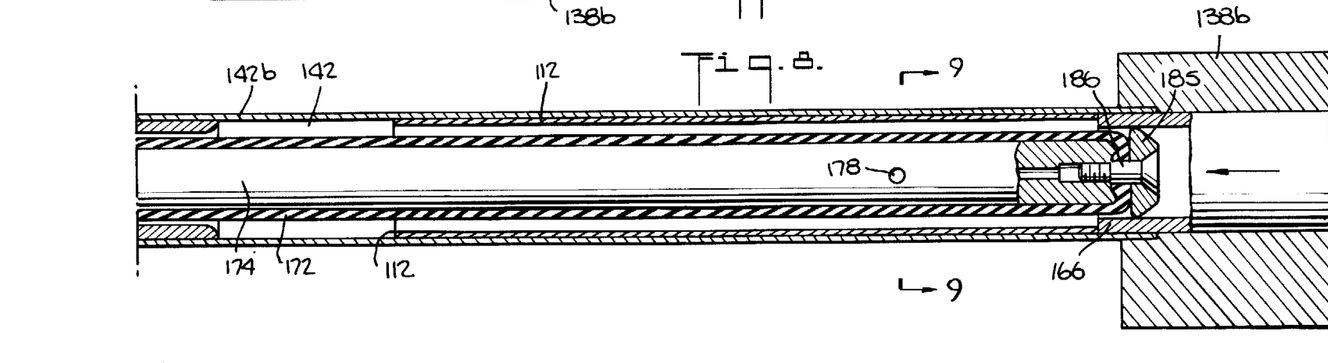

FIGS. 6, 7 and 8 best illustrate this transfer mechanism. The preform cavity block 138b is mounted on a bracket 162. This bracket 162 is connected to a cylinder 164 that causes the bracket 162, and thus the preform cavity 138, to be advanced to the left, as seen in FIG. 6, after the preforming operation is completed. The advancement of the preform block 138b to the left (shown in phantom in FIG. 6) causes the rear end of the preform block 138b to engage the cylinder 142b which defines the forming cavity 142 (see FIG. 7). After the preform block 138b has been so moved, a piston 166 transfers the preform product 112 to the forming cavity 142. FIG. 6 shows the piston 166 not yet advanced. FIG. 7 shows the piston 166 advancing into the preform cavity 138. FIG. 8 shows the piston 166 advanced into the forming cavity 142. The piston 166 is an annular piston having an open center so that when the piston 166 advances into the forming cavity 142 it can accomodate the mandrel mechanism that extends down the center of the forming cavity 142. The piston 166 is then retracted, as is the preform cavity block 138b, so that the forming cavity 142, which is mounted on the disc 140, is free to rotate with the disc 140 as the disc 140 advances 45° to stage II, at which stage the ballon mandrel 172 inflates to hold and position the intermediate product 112.

The piston 166 when fully retracted remains within one end of the preform cavity 138. Thus, the piston 166 is automatically always in alignment with the preform cavity 138 and no special alignment procedures are necessary.

As may best be seen in FIGS. 8, 9, 10 and 11, with particular reference to FIG. 11 the forming cavity 142 is defined by a thin wall cylinder 142b which is mounted through a flange 170 and bolts 171 onto the rotatable disc 140. As indicated above, there are eight of these forming cavities 142 mounted at equally spaced intervals near the periphery of the disc 140. An inflatable rubber tube-like mandrel 172 extends along the length of the forming cavity 142 and is supported on a hollow metal tube 174. This support tube 174 extends back through the disc 140 out a substantial distance as shown in FIG. 11. The support mandrel 174 has an axial bore 176 which communicates with several radial ports 178.

Air under pressure to inflate the rubber mandrel 172 is supplied through a port 180 at the back end of an annular chamber 182. The air then passes through a rear port 178 in the support tube 174 into the axial bore 176. The air is then applied through the forward ports 178 to the inner surface of the inflatable mandrel 172 to cause the mandrel 172 to inflate from the condition shown in FIGS. 8, 9 and 11 to the condition shown in FIG. 10.

After the intermediate product 112 has been inserted into the forming cavity 142, air under pressure is applied to force the inflatable mandrel 172 against the inner wall of the intermediate product 112. AS a consequence, the intermediate product 112 is unwound against the inner wall of the forming cavity 142 and held there under pessure. In this fashion, a precisely dimensioned product is provided. In order to provide this sizing function and assure proper transfer of the preformed intermediate product from the preform cavity 138 into the forming cavity 142, the diameter of the preform cavity 138 is slightly smaller (0.030 inches smaller in one embodiment) than is the diameter of the forming cavity 142. Thus, if the desired end product is to have a diameter of 1.000 inches, the preform cavity will have a diameter of 0.970 inches and the forming cavity 142 will have a diameter of 1.000 inches. The piston 166 that fits within the preformed cavity 138 will then have a diameter of approximately 0.965 inches so that it will have a slipfit relationship with the preform cavity 138 yet be large enought to engage the edge of the intermediate product 112.

Not only does this expandable rubber mandrel 172 aid in sizing the end product by assuring that the web material is flush against the wall of the forming cavity 142 but it preforms one other important function. The mandrel 172 applies pressure to the overlapping edges of the intermediate product to assure that they fuse together when heat is applied.

The inflatable rubber mandrel 172 is fastened at its rear end to the support tube 174 by turns of cord 182 wrapped around the inflatable mandrel 172 at a position over an annular recess 184 in the support tube 174. As may best be seen in FIGS. 7 and 8, the front end of the inflatable mandrel 172 is fastened to the support tube 174 by a washer 185 and screw 186 arrangement which holds a thickened front portion of the rubber mandrel 172 against a forward end of the support tube 174. The forward end of the support tube 174 is slightly re-entrant so that a thickened nose portion of the mandrel 172 can be forced by the washer 185 back into the re-entrant zone to fasten and seal the mandrel 172 to the tube 174. An extruded rubber mandrel of 80 mills (0.080 inches) thickness has been satisfactorily used.

The forming cylinder 142b is a glass reinforced epoxy material having its inner surface coated with a fluorocarbon such as TFE or FEP. This lining performs three functions. First, it aids in assuring that the seam which is formed will be smooth in appearance and thus as visually unobtrusive as possible. Second, this type of coating provides low friction so that the formed product can readily be removed from the forming cylinder without damage to the product. Thirdly, this lining prevents bonding of the polyethelene to the forming cavity.

As shown in FIG. 12, a standard rf heating hairpin coil 192 is positioned at station III parallel to the forming cylinder 142b. The rf heating element 192 is connected to an rf generator 193 which, in one embodiment provides an rf signal of 4.5 kilohertz. The hairpin heating element 192 is positioned close to the forming cylinder 142b at a circumferential location adjacent to the overlap zone at which the seam is to be formed. In one embodiment this rf heating coil 160 was spaced approximately 1/10th of an inch from the outer wall of the forming cylinder 142b.

In one embodiment, the position of the seam was such that the location of the rf heating elements 192 interferred with the rotation of the forming cylinder 142b. In that case, the rf generator 193 was mounted on a retractable mount 194 so that the heating coil 160 could be moved out of the way prior to each indexing of the disc 140.

The rf method of heating results in heating the aluminum foil ply with rf energy, which heat is then transferred to the polyethylene plies to cause, together with the pressure from the balloon mandrel, the overlapping edges to seal. Because only the seam is heated, the rest of the product operates as a heat sink and thus the inner wall of the forming cylinder 142b avoids being overheated and as a consequence has a long life. In addition, because of the heating of the plies to effect the sealing comes from within the material being sealed, an improved and more uniform seal is obtained than if there were heat transfer through the walls of the forming cylinder 142b. There is an avoidance of hot spots and cold spots, both of which tend to cause a non-uniform seal.

In addition, this highly directed and selected heating which affects only the seam and requires a minimum amount of heating of the side wall of the forming cylinder 142b results in a substantial saving in electricity both in the heating stages as well as during the later cooling stages. Indeed, the reduction of cooling requirements saves not only on electricity but also on the cost of the equipment itself.

Because of this rf heating technique, it is important that the intermediate product be accurately radially positioned within the forming cylinder 142b so that the overlap area where the seam is to be made will be positioned close to the heating element 160. Thus the preforming arrangement described in connection with FIGS. 2–5 is important because it assures that the leading and trailing ends of the web segment will overlap at a position at the top of the cavity 138 immediately to the right of the opening as shown in FIG. 3. The position of the seam is normally under the end of the guide 155 because when the overlapping ends are so positioned, the feed roller 151 looses contact with the web material. Use of the rf heating technique described herein requires this preform positioning.

As may best be seen in FIG. 11, the forming cylinder 142b is pressed onto a mount 188 that in turn is held by bolts to a flange 170 of a rearwardly projecting tubular body 190; all of which is bolted to the disc 140. The support tube 174 and mandrel 172 are mounted for longitudinal movement within the forming cylinder 142b and rearwardly extending body 190. This longitudinal movement is required during the operation of removing the formed product. The removal operation is described in detail in the above referenced patent and thus does not have to be repeated here. Furthermore, the indexing of the disc 140 as well as the use of cooling jackets 146 at cooling stages is described in the above referenced patent and does not have to be repeated here. Briefly, it might be noted with reference to FIG. 1, that station I is the loading station, station II is the inflation of the balloon mandrel station, station III is the heating station, stations IV and V are cooling stations and station VI is the removal station.

Between stations V and VI it has been found desirable to deflate the ballon mandrel, blow it up again and deflate it. This process tends to insure that the balloon's adherence to the wall of the formed product is broken. It might also be noticed that the cooling stations in this invention serve primarily to shrink the polyethylene in order to break the adherence of the formed product to the wall of the forming cavity 142 and thereby make removal of the formed product easier and more assured.

The above invention has been described in connection with an eight station machine (not all of the stations being used). However, in one presently preferred embodiment of the invention, a sixteen station machine is employed (again, not all being used). The sixteen station machine had the advantage of providing for greater throughput. In that preferred embodiment, station 1 is a loading station. Station 2 is a dummy station. At station 3 the balloon mandrel is inflated. Station 4 is a heating station. Stations 5 and 6 are essentially dummy at which the seal cools by convection. Stations 7 and 8 have cooling jackets to shrink the polyethylene. Stations 9 and 10 are dummy stations; however, the balloon mandrel is deflated and blown up again as it passes from station 9 to station 10. Finally, station 11 is the ejection station, the balloon mandrel being deflated as it passes from station 10 to station 11. Stations 12 to 16 are dummy.

What is claimed is:

1. In an apparatus for fabricating a flexible cylinder from a multi-ply flexible web material having metal and plastic plies, the improvement comprising:

a preform block having a cylindrical cavity and a first longitudinal opening adapted to receive the multi-ply web material, a feed roller member mounted outside of said cavity and having an axis parallel to the axis of said cylindrical cavity, the periphery of said feed roller being nearly tangent to said cylindrical cavity at said opening, there being a gap between the periphery of said roller and the geometric cylinder defined by the periphery of said roller and the geometric cylinder defined by said cavity.

a pressure plate member mounted outside of said cavity and having an end positioned at said opening, a biasing surface of said pressure plate being normally spaced from the periphery of said roller by a predetermined spacing less than the thickness of said web material, said pressure plate forcing the web material fed into said cavity into contact with said periphery of said feed roller, biasing means coupled to one of said roller and plate members to bias said one of said members towards the other of said members, a stop associated with said one of said members to provide said predetermined spacing as the lower limit of said space between said members, the periphery of said feed roller spaced from whatever web material is fed into said cavity after the trailing edge of said web material has passed said biasing surface of said pressure plate.

2. The improvement of claim 1 further comprising:
a second opening in the wall of said cavity, and
means to apply an air stream through said opening into said cavity.

3. The improvement of claim 1 further comprising:
a guide plate positioned at said opening and spaced from the periphery of said feed roller by an amount substantially less than the thickness of the web material,
said guide plate having an edge longitudinal to said cavity and facing the leading edge of the web material being fed into said cavity.

4. The improvement of claim 2 further comprising:
a guide plate positioned at said opening and spaced from the periphery of said feed roller by an amount substantially less than the thickness of the web material,
said guide plate having an edge longitudinal to said cavity and facing the leading edge of the web material being fed into said cavity.

5. The improvement of claim 1 further comprising:
a forming cylinder having a forming cavity axially aligned with said preform cavity,
means to transfer whatever preform product is formed in said cylindrical cavity longitudinally into said forming cylinder, the seam area of the preform product being positioned at a predetermined circumferential position within said forming cylinder,
an rf heating element longitudinally aligned with said predetermined circumferential position of said forming cylinder, the energization of said heating element causing heating of the preform product substantially only at the seam area to provide an end product.

6. The improvement of claim 3 further comprising:
a forming cylinder having a forming cavity axially aligned with said preform cavity,
means to transfer whatever preform product is formed in said cylindrical cavity longitudinally into said forming cylinder; the seam area of the preform product being positioned at a predetermined circumferential position within said forming cylinder,
an rf heating element longitudinally aligned with said predetermined circumferential position of said forming cylinder, the energization of said heating element causing heating of the preform product substantially only at the seam area to provide an end product.

7. The improvement of claim 4 further comprising:
a forming cylinder having a forming cavity axially aligned with said preform cavity,
means to transfer whatever preform product is formed in said cylindrical cavity longitudinally into said forming cylinder; the seam area of the preform product being positioned at a predetermined circumferential position within said forming cylinder,
an rf heating element longitudinally aligned with said predetermined circumferential position of said forming cylinder, the energization of said heating element causing heating of the preform product substantially only at the seam area to provide an end product.

8. In an apparatus for fabricating a flexible cylinder from a multi-ply flexible web material having metal and plastic plies, the improvement comprising:
a preform member having a cylindrical cavity and a first longitudinal opening adapted to receive the multi-ply web material,
a feed roller mounted outside of said cavity and having an axis parallel to the axis of said cylindrical cavity, the periphery of said feed roller being nearly tangent to said cylindrical cavity at said opening, there being a gap between the periphery of said roller and the geometric cylinder defined by said cavity,
a pivotal pressure plate mounted outside of said cavity and having an end positioned at said opening, a biasing surface of said pressure plate being normally spaced from the periphery of said roller by an amount less than the thickness of said web material, and biasing means coupled to said pressure plate for urging said plate toward said roller, said pressure plate forcing the web material fed into said cavity into contact with said periphery of said feed roller,
the periphery of said feed roller spaced from whatever web material is fed into said cavity after the trailing edge of said web material has passed said biasing surface of said pressure plate.

9. The improvement of claim 8 further comprising:
a second opening in the wall of said cavity, and
means to apply an air stream through said opening into said cavity.

10. The improvement of claim 8 further comprising:
a guide plate positioned at said opening and spaced from the periphery of said feed roller by an amount substantially less than the thickness of the web material, said guide plate having an edge longitudinal to said cavity and facing the leading edge of the web material being fed into said cavity.

11. The improvement of claim 9 further comprising:

a guide plate positioned at said opening and spaced from the periphery of said feed roller by an amount substantially less than the thickness of the web material, said guide plate having an edge longitudinal to said cavity and facing the leading edge of the web material being fed into said cavity.

12. The improvement of claim 8 further comprising:

a forming cylinder having a forming cavity axially aligned with said preform cavity, means to transfer whatever preform product is formed in said cylindrical cavity longitudinally into said forming cylinder, the seam area of the preform product being positioned at a predetermined circumferential position within said forming cylinder, an rf heating element longitudinally aligned with said predetermined circumferential position of said forming cylinder, the energization of said heating element causing heating of the preform product substantially only at the seam area to provide an end product.

13. The improvement of claim 10 further comprising:

a forming cylinder having a forming cavity axially aligned with said preform cavity, means to transfer whatever preform product is formed in said cylindrical cavity longitudinally into said forming cylinder; the seam area of the preform product being positioned at a predetermined circumferential position within said forming cylinder, an rf heating element longitudinally aligned with said predetermined circumferential position of said forming cylinder, the energization of said heating element causing heating of the preform product substantially only at the seam area to provide an end product.

14. The improvement of claim 11 further comprising:

a forming cylinder having a forming cavity axially aligned with said preform cavity, means to transfer whatever preform product is formed in said cylindrical cavity longitudinally into said forming cylinder; the seam area of the preform product being positioned at a predetermined circumferential position within said forming cylinder, an rf heating element longitudinally aligned with said predetermined circumferential position of said forming cylinder, the energization of said heating element causing heating of the preform product substantially only at the seam area to provide an end product.

* * * * *